Dec. 24, 1940.                    D. ALLISON                    2,226,331
CASTING FLOAT
Filed Feb. 4, 1939
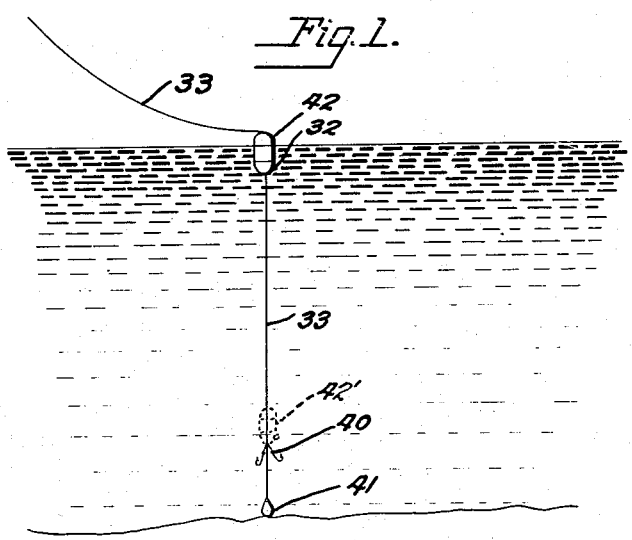
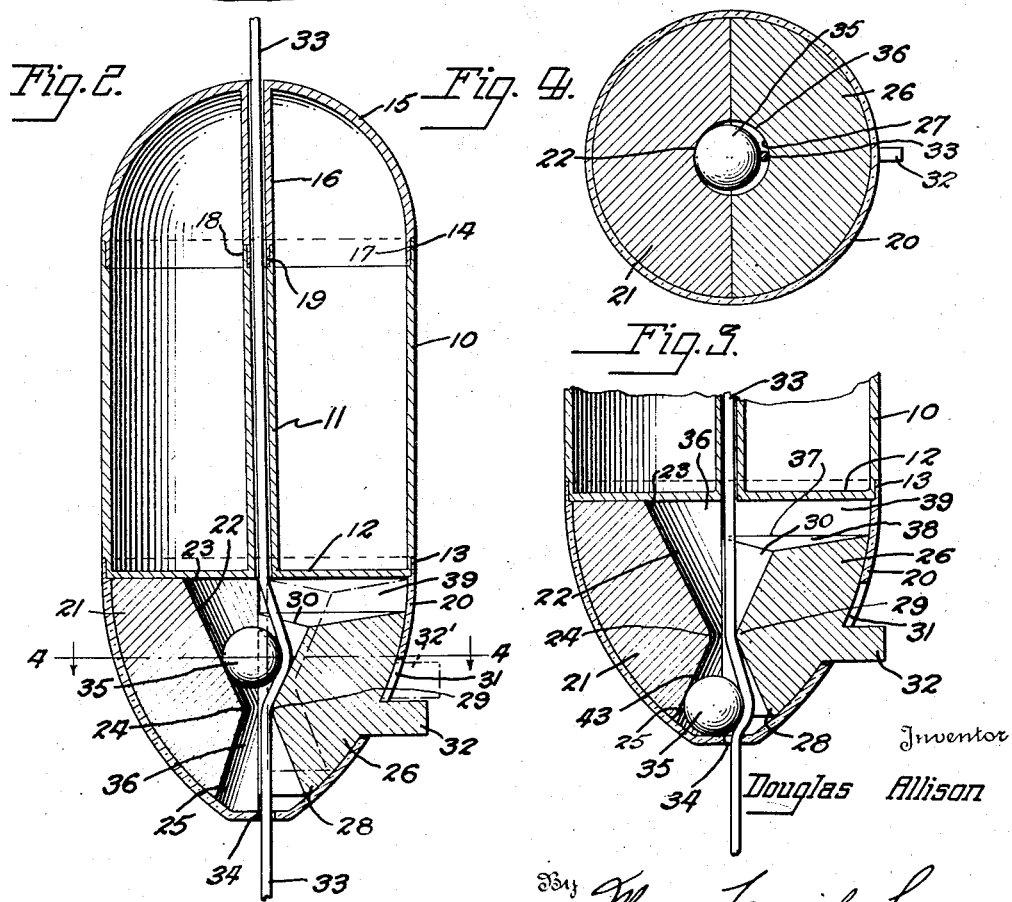
Inventor
Douglas Allison
By Mason Fenwick + Lawrence
Attorneys Patented Dec. 24, 1940

2,226,331

UNITED STATES PATENT OFFICE 2,226,331

CASTING FLOAT

Douglas Allison, Fort Worth, Tex., assignor of one-half to Virgil Lowrie, Fort Worth, Tex.

Application February 4, 1939, Serial No. 254,714

14 Claims. (Cl. 43—49)

This invention relates to fishing appliances and more particularly to a fish casting float appliance especially adapted for use in connection with casting.

In casting it is frequently desirable to have a relatively long stretch of line between the float on the surface of a body of water, and the hooks or sinker positioned at a more or less considerable depth below the surface. To cast with a long stretch of line beyond the float is very difficult, at least very awkward. Frequently the hooks catch in surrounding objects and under the most favorable circumstances the casting operation is a very difficult one.

One object of this invention is to provide a device which, when in use, will eliminate the foregoing disadvantages.

It has been common practice in the past to provide floats with gripping means so that the float may be secured at a definite point on the line, remote from the hooks or sinker. The device may be releasable upon reeling in the line. When the float reaches the fishing rod the gripping means is released. Such devices are subject to the heretofore mentioned disadvantages, allowing the line, during the casting operation, to be subject to a whipping action.

A further object of this invention is to provide a device which has the advantages of prior devices, but which is free of their disadvantages.

A further object is to provide a float device which at all times may be readily inspected to determine the condition of its gripping or non-gripping action with respect to the line. Yet another object is to provide a device which is easily and quickly adjusted.

Another object is to provide a device of the type contemplated with transparent or translucent portions so that the positions of the parts may be readily observed. Other objects of the invention include: providing an inexpensive float, an easily manufactured float, a quickly applied float, and a readily detachable float. Other objects and advantages of this invention will appear in the following description taken in connection with the accompanying drawing.

In the drawing, wherein like numerals represent corresponding parts of the various figures:

Figure 1 is a view indicating the float in use;

Figure 2 is an enlarged vertical cross section showing the parts in their respective relation;

Figure 3 is an enlarged partial section showing the float ready for casting;

Figure 4 is a cross-section substantially on the line 4—4 of Figure 2.

Considering the drawing in greater detail, the device includes a float having a passageway extending therethrough, a line passing through said passageway, and relatively movable means adapted to engage said line.

In Figure 2 a float incorporating features of this invention is shown in cross-section. The device, being a preferred embodiment, comprises a hollow central body member 10 having a narrow tube 11 passing substantially centrally thereof. The body has its lower end closed by a partition or dividing wall 12 and having undercut offset portions 13 and 14 which may be arranged for a tight mechanical fit with other parts hereinafter described, or which may be threaded for engagement with the said parts.

The upper end of the float is closed by a semi-spherical cap member 15 arranged to fit upon the cylindrical part 10, and having a tube 16 passing through it. An annular flange 17 of the cap engages the undercut portion 14 of the barrel 10. A similar undercut part 18 on the cap tube engages an undercut part 19 on the central tube 11.

The lower end of the float is provided with a bullet nose shell 20 containing the means for gripping the line. This hollow shell structure, which is substantially circular in transverse cross-section, as viewed in Figure 2, has a fixed member 21 substantially filling one-half of the shell. This element or cam has a central channel or half-passage 22 which varies in cross-section from the upper end 23 to the orifice portion 24 and thereafter increases in cross-section to the lower end 25. A similarly shaped cam member 26 partially fills the other half of the shell and is movable therein. Member 26 has a central half-passage 27 decreasing in cross-section from the lower end 28 up to the orifice 29 and gradually increasing again to point 30. The two half-passages 22 and 27 cooperatively form a tapering passageway at either side of the reduced diameter at 24.

The shell 20 is provided with an elongated aperture or slot 31 through which extends an arm 32 carried by the movable cam member 26. It will be observed that the cam member 26 is movable and may be moved by moving the arm 32 from its solid line position, in Figures 2 and 3, to the dotted line position 32' shown in Figure 2.

A fishing line 33 passes through the float, and more particularly through the tubes 16 and 11 in the cap and body parts respectively, and finally through the passageway formed by the complementary half-passages 22 and 27, and finally passing out of the lower end of the float through the opening 34. With the parts as thus far described, the line can readily move through the float in either direction.

In addition to the fixed and movable cam members 22 and 26 thus far described, the lower shell portion 20 contains a sphere or ball 35 which is free to move back and forth through the passageway 36 (comprising the complementary half-passages 22 and 26). The ball is preferably made of material to resist the corrosive action of sea water. It is of such a diameter that it cannot pass through the small orifice formed between the two cams when they are in the position shown in Figure 3. The diameter of the ball is such, however, that with the movable cam 26 in the dotted line position of Figure 2, the ball can readily pass from the upper to the lower parts of the passage or vice-versa.

The upper surface 37 of the cam 26 is grooved and tapered as at 38. If the ball works into the space 39 between the cam, in its lower position, and the wall 12, it can readily roll toward the center of the float and drop back into the passageway. In the preferred design, however, the distance between the wall 12 and the cam 26 will be less than the diameter of the ball so that it will be impossible for the ball to work over above the cam.

With the parts in the position indicated in Figure 3, the line can freely move in either direction through the float. When it moves up, however, it also moves the ball. Before casting, the fisherman will move the float down to the hooks 40 or the sinker 41 whichever is closer to the rod or reel. This will draw the ball above the cam 26 by lifting the cam, which will immediately fall back beneath the ball. The fisherman may trip the trigger upward to let the ball down into the lower part of the passageway as viewed in Figure 3. If he neglects to do this the impact of the water against the trigger 32 when the float strikes the water will automatically trip the cam.

After the casting has been performed the line will have been thrown out into the water, and the float will rise along the line as the line passes through the float and the sinker 41 reaches the bottom. The fisherman can then reel in the line a little bit to regulate the location of the hooks 40 with respect to the float, and more particularly in connection with the kind of fish sought after.

As soon as the line 33 is reeled in, however, the fish line will frictionally engage the ball 35 and cause it to ride upon the fixed surface 43 of the fixed cam 21 thereby causing the movable cam 26 to move into the dotted position of Figure 2, at which time the ball 35 passes from the position shown in Figure 3 to that of Figure 2. After this has occurred, and the line is partially released, the cam 26 drops to the bottom of the slot 31, if that determines its limit of movement and the ball remains in the upper part of the passage. The release of the line by the fisherman then allows the ball to grip the line as shown in Figure 2. As soon as a fish is caught on the hook the line can be reeled in. During such operation the line freely passes the clutch or gripping members, comprising the cams and ball 35, until the hook engages the float, at which time the line will be withdrawn from the water. When the fisherman is about to recast he resets the latch as shown in Figure 3, and can then re-cast the float and hook in another endeavor to catch fish.

The central tube 11 in Figure 2 is shown substantially in a central location, although this tube may be positioned off center as shown in Figure 3. It will be noted that the aperture 34 is off center. The parts, thereby, cooperating to always allow the fish line to pull the ball against the fixed cam. In this manner the device is always in operative position.

The parts of the float except the ball will preferably be made of light-weight material such as synthetic resins or other plastics. The central body portion is arranged to act as an air reservoir in the float. The lower end is preferably made of transparent or translucent material so that the cam and ball can be inspected before casting for fish. This may be true of a small window portion only on the shell 20 and cams 21, 26 can all be made transparent. The device is thereby light in weight, easily examined as to position of line clutch parts, and easy to make.

Although a preferred embodiment of the invention is illustrated and described, variations within the true spirit and scope of the same are to be determined by the appended claims.

What I claim is:

1. A fish casting float including a body, a restricted passage therein, a line passing through said passage, a ball movable in said passage adapted to assume jamming relation to said line, and means for varying the size of the restricted passage.

2. A casting float comprising a hollow shell, a tubular passage extending therethrough, a portion of said passage comprising relatively movable cam surfaces, and a ball loosely mounted in said passage.

3. A casting float comprising a hollow shell, a tubular passage extending therethrough, a portion of said passage comprising relatively movable cam surfaces, a ball loosely mounted in said passage, and means on one of said cams extending exteriorly of said shell arranged to manually effect said relative movement.

4. A casting float comprising a hollow shell, a passage extending therethrough, a portion of said passage comprising oppositely tapering cam surfaces, and means for effecting relative movement of said surfaces whereby to effect a temperorary enlargement of said passage.

5. A casting float comprising a hollow shell, a passage extending therethrough, a portion of said passage comprising oppositely tapering cam surfaces, and means for effecting relative movement of said surfaces whereby to effect a temporary enlargement of said passage, the other part of said passage being off center with respect to said last described portion.

6. A casting float comprising a separable shell, complementary tube elements carried by the separable shell parts, relatively movable cams forming a double tapered passage in continuation of said tube, a ball loosely mounted in said passage, an aperture in said shell, means extending through said aperture for manually effecting said relative movement.

7. A casting float comprising a separable shell, complementary tube elements carried by the separable shell parts, relatively movable cams forming a double tapered passage in continuation of said tube, a ball loosely mounted in said passage, an aperture in said shell, means extending through said aperture for manually effecting said relative movement, said cams and shell being transparent whereby to make the ball and cams visible from the exterior of said shell.

8. A line gripping device comprising a main body having a passage therein, a part of said passage having relatively movable walls, and means operable by the line for effecting relative movement of said walls and arranged to restrict the movement of the line through the device in one direction only and manually resettable to allow the line to move therethrough in the opposite direction whereby to effect an enlargement of said passage.

9. A line gripping device comprising a main body having a restricted passage extending therethrough, a wall portion of said passage being relatively movable with respect to said restricted part, a line passing through the passage, and a ball loosely movable in said passage in gripping relation to said line.

10. A clutch device comprising a main body having a restricted passage extending therethrough, a line extending through the passage, and a ball loosely movable in the passage to either side of the restriction thereof, one wall portion of said passage being relatively movable with respect to the restriction whereby the ball may move from one side of said restriction to the other.

11. A line gripping device comprising a main body having a restricted passage extending therethrough, a wall portion of said passage being relatively movable with respect to said restricted part, a line passing through the passage, and a ball loosely movable in said passage in gripping relation to said line, and manual means for locating the ball in either line gripping or non-gripping position.

12. A line gripping device comprising a main body having a restricted passage extending therethrough, a wall portion of said passage being relatively movable with respect to said restricted part, a line passing through the passage, a ball loosely movable in said passage in gripping relation to said line, said wall portion being manually movable to position said ball whereby the line will have unrestricted movement in one direction and be restricted as to movement in the opposite direction.

13. A line gripping device comprising a body having a passage therethrough, relatively movable cams forming a restricted orifice in said passage, and a ball loosely movable in said passage.

14. A casting float comprising a body having a passage extending therethrough, a line extending through said passage and a line-jamming element movable in said passage, the intermediate part of said passage being of variable cross-sectional dimension, from a size too small to permit passing of said element to a size permitting passing of said element, said passage including portions on opposite sides of said intermediate part tapering toward said intermediate part and forming chambers for loosely receiving said line-jamming element, said element when in one of said chambers constituting means, when urged by the frictional pull of the line toward the other chamber, for enlarging said intermediate part, permitting the passing of said element to said other chamber.

DOUGLAS ALLISON.